United States Patent [19]

Shettel

[11] Patent Number: 5,002,428
[45] Date of Patent: Mar. 26, 1991

[54] IRRIGATION METHOD

[76] Inventor: Ralph Shettel, Rte. 1, Box 4047, Twin Falls, Id. 83301

[21] Appl. No.: 145,297

[22] Filed: Jan. 19, 1988

[51] Int. Cl.⁵ .............................................. E02B 13/00
[52] U.S. Cl. ...................................... 405/39; 405/36; 405/37
[58] Field of Search ....................... 405/39, 38, 37, 36, 405/43, 45, 48, 52

[56] References Cited

U.S. PATENT DOCUMENTS

| | | | |
|---|---|---|---|
| 315,629 | 4/1885 | Jessup | 405/39 |
| 545,535 | 9/1895 | Roney | 405/39 |
| 585,103 | 6/1897 | Jamison | 405/39 |
| 3,410,094 | 11/1968 | Shelley | 405/39 |
| 3,837,619 | 9/1974 | Sherman | 405/39 |
| 4,464,079 | 8/1984 | Chance | 405/37 |

OTHER PUBLICATIONS

Cablegation Automated Surface Irrigation System Brochure Idaho Power EMD-032 7/82.

Primary Examiner—Dennis L. Taylor

[57] ABSTRACT

Preferably for irrigation purposes wherein a sloping conveyance includes multiple and like sized orifices aligned therealong in near level relationship to thereby provide diverted water balanced access to the orifices. A uniflow system incorporating sloping supply, downstream valved-riser and orifice line segmentation in relative position whereby selective valve actuation causes a diversion to well-up to and out the orifices simultaneously and thereby cause the automatic distribution of duplicated flow to the land. Actuator assembly mounting automates the diversion. Actuator mounting in communication with a remote controller further automates diversions through systems programming.

9 Claims, 1 Drawing Sheet

IRRIGATION METHOD

The present uniflow system is an innovation that appropriately benifits the practice of distributing water to crop land. 'Uniflow' is understood to describe, in one word, the self-effecting delivery of flow and distribution. The method represented modifies the common gravity irrigation system. In this, the irrigator is required to produce and maintain a diversion through extensive balancing manipulations. It will be revealed that the uniflow method substantially frees the operator's hand from that chore while eliminating repeated annual expenses and the time consuming aspects of common practice. This is the practical object of the invention.

While the incorporation of commercial gated pipe is anticipated when such is already in place and where minimal sloping conditions prevail. However, adjustment by hand is self-defeating to the practical application of automation. The uniflow is specifically designed to produce a hands-off diversion. This is prerogative to developing the ultimate objective of the invention.

Furthermore, a benificial side effect is realized through increased efficiency that can truely reduce the likelihood of pure negligence and estimating flow volume that persist in wasting the water resource while washing the top soil away.

Other objects of the invention will emerge with a complete understanding of the following, wherein.

With a more detailed reference to the drawing, like numbering of like parts will identify their working relationship while revealing the invention's potential.

Figure 1:
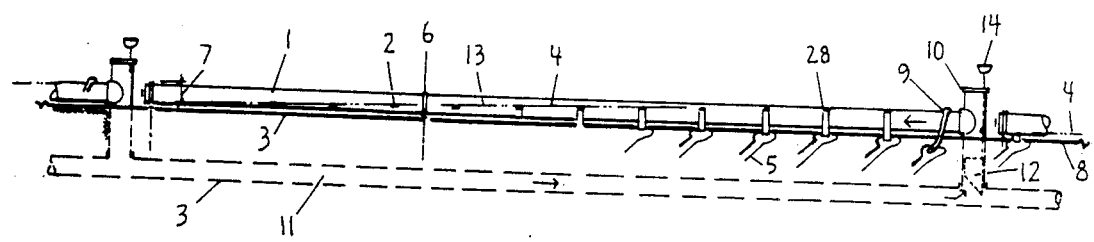
FIG. 1 is a first depiction of the uniflow distribution method.

In the depiction of FIG. 1, a supply conveyance 1, like a conduit, is seen to cooperate with multiple and like sized orifice perforations 2 located in the wall thereof. The conveyance, of plastic, aluminum or other suitable material, is arranged to carry a desired slope 3. And the orifices are alined nearly level, as at water line 4, to thereby allow diverted water access in the conveyance below the line of orifices, as at 15.

Figure 2:
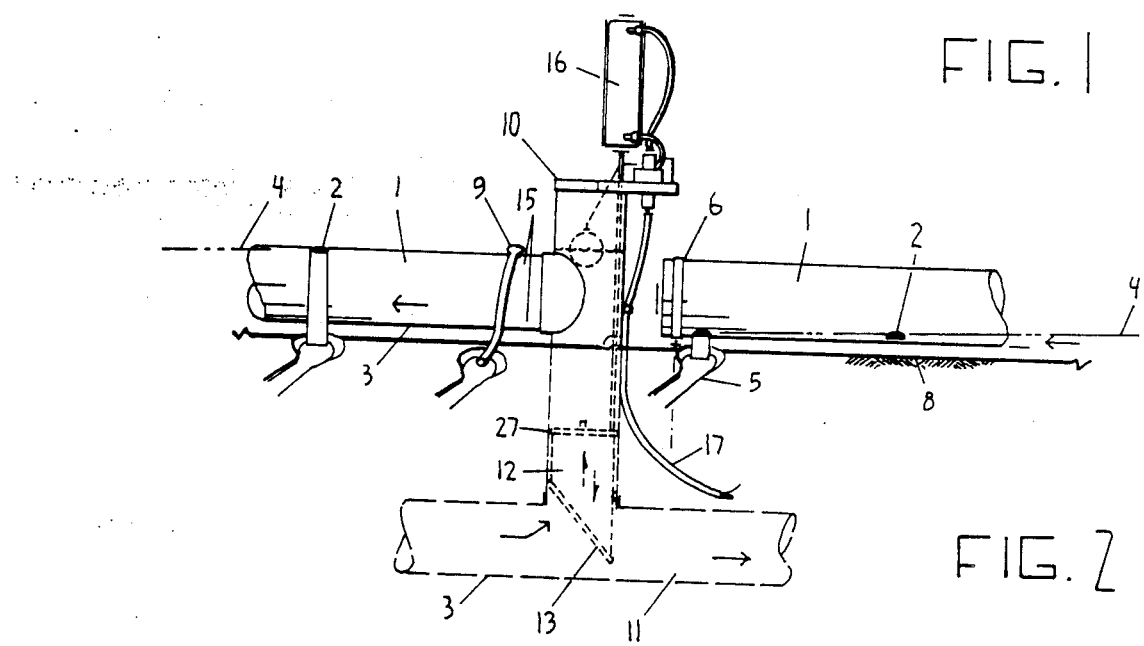
FIG. 2 is a view of the diversion mechanism.

FIG. 2 reveals the diversion assembly as valved-pipe 10 connects the conveyance to supply pipe 11, which have suitable relative postion, that is, the desired working relationship that best satisfy conditions in the field. Typically, the diversion originates upstream. In the present art, it will be seen to originate downstream. For the valving need, there are a variety of flapper, butterfly and gate types available today. However, the preferred valve is seen to be simply a sleeve insert 12 that has the capability of sliding engagement with the riser-pipe to check water selectively, while including extremity configuration for closure against the supply pipe wall for shutoff. Ring seals 28 and extremity seal 13 are provided to remove leak from the riser-diversion and supply-shutoff. Operation of the valve is through control 14 routed in the riser. Control linkage is made smooth to minimize the effect of water born trash that may enter the supply system, though those waters be screened. The valve, itself, can be readily pulled for easy maintenance. Also, the riser is sized like the supply to facilitate shutoff, and its upward extension serves for the mounting of mechanisms while bringing the working water level to those mechanisms for monitoring and control. In actual practice, actuation of sleeve 12 selectively obstructs head water in the supply pipe causing the diversion of quiet water to well-up in the riser and back-up in the conveyance to the orifices and simultaneously discharge duplicated flow in automatic distribution to the corrugates, as at 5. Furthermore, raising and lowering the water line over the orifices increases and decreases flow in response to crop and seasonal demand. It has been shown that the uniflow method is the reverse of accepted practice, and that the quiet of welling-up is preferred over gravity fed perforation presubmergence, pressure imbalance and unrelated discharge.

Adjustments are allowed in the support of conveyance 1 as yoke and extremity attachment 6 provide selective vertical and axial movement maintaining the right working relationship between a water line and the line of orifices.

Figure 3:
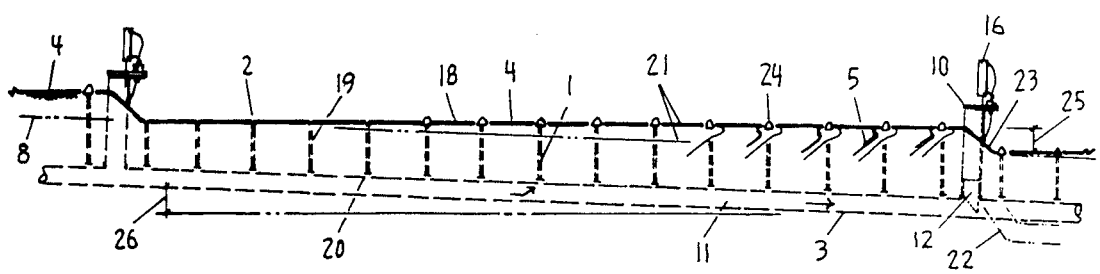
FIG. 3 is a second depiction of the uniflow distribution method.

The working installation benefits from the natural slope to the land in providing the essential orifice line segmentation, that is, vertical separation between orifice lines, as at 7 of FIG. 1 and at 25 of FIG. 3. In the diversion process, this established check identity, or individuality, collectively produces set identity, that is, the working check identities needed to disperse the water right in meeting crop and seasonal demand. The orifice line segmentation will be long in the case of flat conditions and shortened as the slope to the land increases. Preferably, supply pipe slope is standardized minimal whatever the field conditions. In response to steeper conditions, segmentation differential will increase, as at 23, with the incorporation of drop 22, as the need occurs. Otherwise, the whole process can be customized as various runs and numerous conveyance types and discharge combinations are introduced.

Continuing, tubes 9 are included, in part, for the purpose of routing high orifice flows to the ground and in overcoming extreme grade situations. System drainage, in anticipation of off season freezing, is automatic and self-flushing.

Having, thusly, removed the irrigator's hand from the flow rate and distribution process, one is able to seriously consider automation, and the application of the mechanisms to riser 10 as manual valve actuation is replaced by automatic valve actuation. This is accomplished by replacing control 14 with a mounted type of cylinder 16, or ram, for local use, complete with cooperating component assembly consisting of float limit directional valving, pressure regulator, seasonal reciever and timer, all of which are in common supply. Motors and water pressure are seen as but two of the actuation alternatives, be they air, oil, water, electric or the like powered and/or actuated. And the incorporation of field sensors and manifold distribution to the diversion sites complete with computer program and signaling 17, be the activation by infrared, laser, radio, electric or the like, are seen to furnish the complete automation of the invention, which is the ultimate objective of the invention.

In the depiction of FIG. 3, using the before described approach relative to the same irrigation practice, the nearly level line of conveyance orifices of FIG. 1 become the nearly level line of orifices 18 of multiple and like sized tubes 19 that are seen to extend laterally upward from attachments to sloping supply pipe 11 to thereby provide tube length gradient. In the preferred arrangement, the resulting water column produces down-pressure gradient, maximized at 25, which offsets supply slope up-pressure gradient, maxumized at 26, whereby increasing pressure by diversion causes balanced water welled-up to the orifices to simultaneously fount duplicated flow in automatic distribution to the corrugates, as at 5. At the surface, the progressively more tube exposure is mounded with earth, as at 21. Preferably, supply pipe slope matches the grade to the land. Valved-riser 10 has no outlet but still serves the diversion by bringing the checked water line to the mechanisms. It follows that the previously described remote programming is applicapable to this case.

Furthermore, it is anticipated that the supply pipe perforations feeding the tubes, as at 20, may include gradient restriction to produce pressure offset for instalitions set to grade or for tubes of whatever length.

While the drawing depicts the flow-thru practices typical for gravity distribution, the present system utilizes a closed mainline whereby head water is maintained for immediate use at all diversion locations. Ready-made hydrants mounted in-line submercible and systematized through water powered actuators are expected future practice.

It has been shown that some slope to the land is required to provide orifice line segmentation. However, in near level conditions the effect of checked water can extend far beyond the intended diversion. Therefore, it is necessary to promote check idenity through shutoff of the riser, while the check is at rest, using a common spring-loaded butterfly, or a like control, mounted at the sleeve or riser outlet which is set to open automatically with diversion actuation. In the case of FIG. 3, the same control of diversion is realized as an offset mainline is valved to segmented supply pipes feeding the tubes.

The foregoing specification along with the drawing reveal the preferred embodiment that best satisfies the object of the invention. However, obvious modification is held to be within the scope of the numbered claims.

What is claimed is:

1. To automate the diversion of water, a uniflow system comprising;

the slope of a conveyance means cooperating with multiple and like sized orifice means set nearly level therealong to thereby allow diverted water access below said orifices;

a sloping supply pipe means having downstream valved-riser means connection therebetween with manual control means disposed for selective actuation causing quiet water to well-up to and out orifices simultaneously discharging duplicated flow in automatic distribution.

2. The combination of claim 1 being further characterized by drop means producing orifice line segmentation.

3. The combination of claim 2 being further characterized by conveyance support means disposed in selective vertical and axial adjustment maintaining orifice line to water line.

4. The combination of claim 1 with said manual control being a mounted, powered actuator mechanism means disposed for local use causing a diversion automatically.

5. The combination of claim 4 with said powered mechanism being further characterized as having communication with programming means causing diversions by remote control.

6. The combination of claim 1 with said valve being a sleeve insert means in sliding engagement with said riser for selective position capability of diversion and shutoff with said riser disposed for water level monitoring.

7. The combination of claim 2 with said conveyance orifices being multiple and like sized tube orifice means disposed nearly level with opposite extremity gradient attachment to the supply pipe whereby water colume and slope pressure gradient offset means produces balanced water at the orifices with increasing pressure by diversion simultaneously founting duplicated flow in automatic distribution.

8. The combination of claim 1 with said valved-riser including a shutoff means mounted in the outlet thereof disposed closed while at rest and to open automatically with diversion actuation.

9. The combination of claim 7 with said near level tube orifices being orifices set on-grade with supply attachment being further characterized by perforate restriction gradient means disposed to produce pressure offset.

* * * * *